Figure 1:
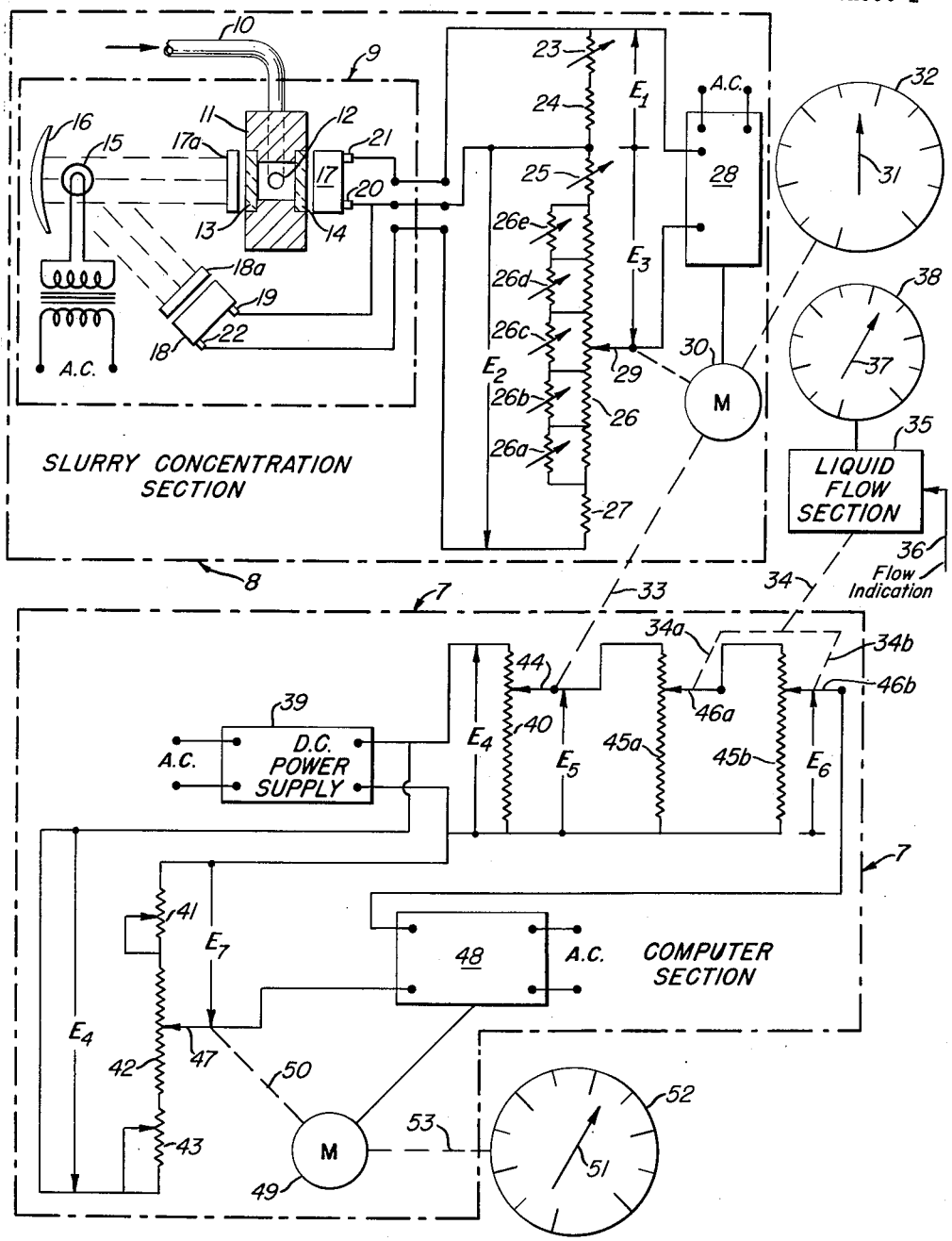

INVENTOR.
Frank A. Leisey
BY
William J. Birmingham
ATTORNEY

May 8, 1962 F. A. LEISEY 3,033,036
DETERMINATION OF SOLID FLOW RATE
Filed Oct. 31, 1957 2 Sheets-Sheet 2

INVENTOR.
Frank A. Leisey
BY
William J. Birmingham
ATTORNEY

United States Patent Office 3,033,036
Patented May 8, 1962

3,033,036
DETERMINATION OF SOLID FLOW RATE
Frank A. Leisey, Chicago, Ill., assignor to Standard Oil
Company, Chicago, Ill., a corporation of Indiana
Filed Oct. 31, 1957, Ser. No. 693,665
6 Claims. (Cl. 73—194)

The present invention relates to a method and means for determining solid flow rate. More particularly, it relates to an apparatus for determining the rate at which a normally-solid particulate substance is added to a variable-flow fluid stream.

In any mixing, physical contacting, chemical and the like process in which a solid, particulate material is introduced, mixed, commingled, or otherwise added to a fluid stream, it is important for process control and/or economy purposes to know, that is, to measure, the rate at which the solid material is being added. Measurement of the flow rate of gases, liquids, and free-flowing solid particles is relatively simple, and many suitable devices therefor can be purchased through normal commercial channels.

The measurement of the flow rate of solid particles which are not free-flowing, i.e., do not behave like fluids, has led to a number of practical problems which do not lend themselves to solution by conventional measurement techniques. For example, an attempt has been made to control the rate at which particulate aluminum chloride is added from a hopper to a stream of benzene by controlling the speed of the feed mechanism, e.g., a screw or star-type feeder. Such attempted control, however, has proved ineffective because of sticking of the aluminum chloride to the feed mechanism and/or because of bridging, channeling, packing, and the like of the aluminum chloride in the supply hopper. Such difficulties also render level gauges, Bindicators, and the like equally ineffective. Moreover, strain gauges attached to the supply hopper have proved to be too costly and relatively insensitive. Measurement of the light-transmissivity of the slurry of aluminum chloride and benzene is also misleading because the flow rate, i.e., flow per unit time, of the benzene by itself or the light-transmissivity and/or color thereof may likewise simultaneously vary.

It is therefore an object of the present invention to provide an apparatus for the inexpensive and accurate measurement of the rate in which a particulate, solid material is added to a fluid stream. It is another object of the present invention to measure the amount per unit time at which a particulate, solid substance is added to a fluid stream, the flow rate of which (weight or volume per unit time) may be simultaneously and/or intermittently varying. It is a still further object of the present invention to measure the rate at which normally-solid particles are added to a fluid stream, the rate of flow and/or light-transmissivity of which also varies. These and other objects of the present invention will become apparent as the detailed description thereof proceeds.

Briefly, my invention comprises in combination a light-transmissivity comparison means, said means providing a first signal which varies with the concentration of a solid material suspended in a fluid medium; a flow measuring means, said flow-measuring means providing a second signal which varies with the flow per unit time of said fluid medium; and a first self-balancing potentiometer system with a first rebalancing motor, responsive to the product of said first signal and said second signal whereby the response of said first rebalancing motor provides a measure of the flow rate of the solid material.

In a particular embodiment of my invention, the above-mentioned light-transmissivity comparison means may comprise a light-transmissivity comparison device, said device providing an electrical indication which varies with the light-transmissivity of the commingled material and fluid medium; and a second self-balancing potentiometer system, with a second rebalancing motor, responsive of said indication, the response of said second motor being adjustably non-linearizable with respect to said indication whereby said response may be adjusted to vary in accordance with the concentration of said material in said fluid medium, and thereby provide said first signal. Response of the second rebalancing motor which is actuated by the light-transmissivity comparison device is made adjustably non-linearizable to compensate for the fact that in many instances light-transmissivity and concentration of a commingled solid and fluid is not a linear function.

The expression "adjustably non-linearizable," in connection with the response of the motor drive, means that the self-balancing potentiometer is designed so that the motor drive can be adjusted to respond according to any selected function of the signal from the light transmissivity comparison device. Thus, where the relationship between light transmissivity and concentration is not a linear function, the motor drive can be adjusted so that the motor will respond linearly with concentration. Similarly, any other components which are responsive to the motor drive are likewise linearized with respect to concentration.

Where both the flow rate and the light-transmissivity of the fluid medium vary, my light-transmissivity comparison means provides a signal which varies with the light transmissivity of the commingled substance and fluid medium as compared with the light-transmissivity of the fluid medium alone. Thus, changes in light-transmissivity of the fluid medium itself will not be interpreted as a change in concentration of the solid material in the fluid medium.

In another particular embodiment of my invention, indicator means are operatively connected to the rebalancing motor or motors of the self-balancing potentiometer system or systems. Thus, an indicator means actuated by the rebalancing motor which is responsive to the electrical indications, e.g., voltage or current, from the light-transmissivity comparison device, provides a measure of the concentration of the solid material in the fluid medium. Indicator means actuated by the rebalancing motor which is responsive to the product of the first and second signals provides a direct measure of the rate, that is, weight or volume per unit time, at which the solid is mixed with the liquid. The indicator means may take any conventional form such as a dial face and indicator arrow, a permanent recording device, and the like.

Figure 2:
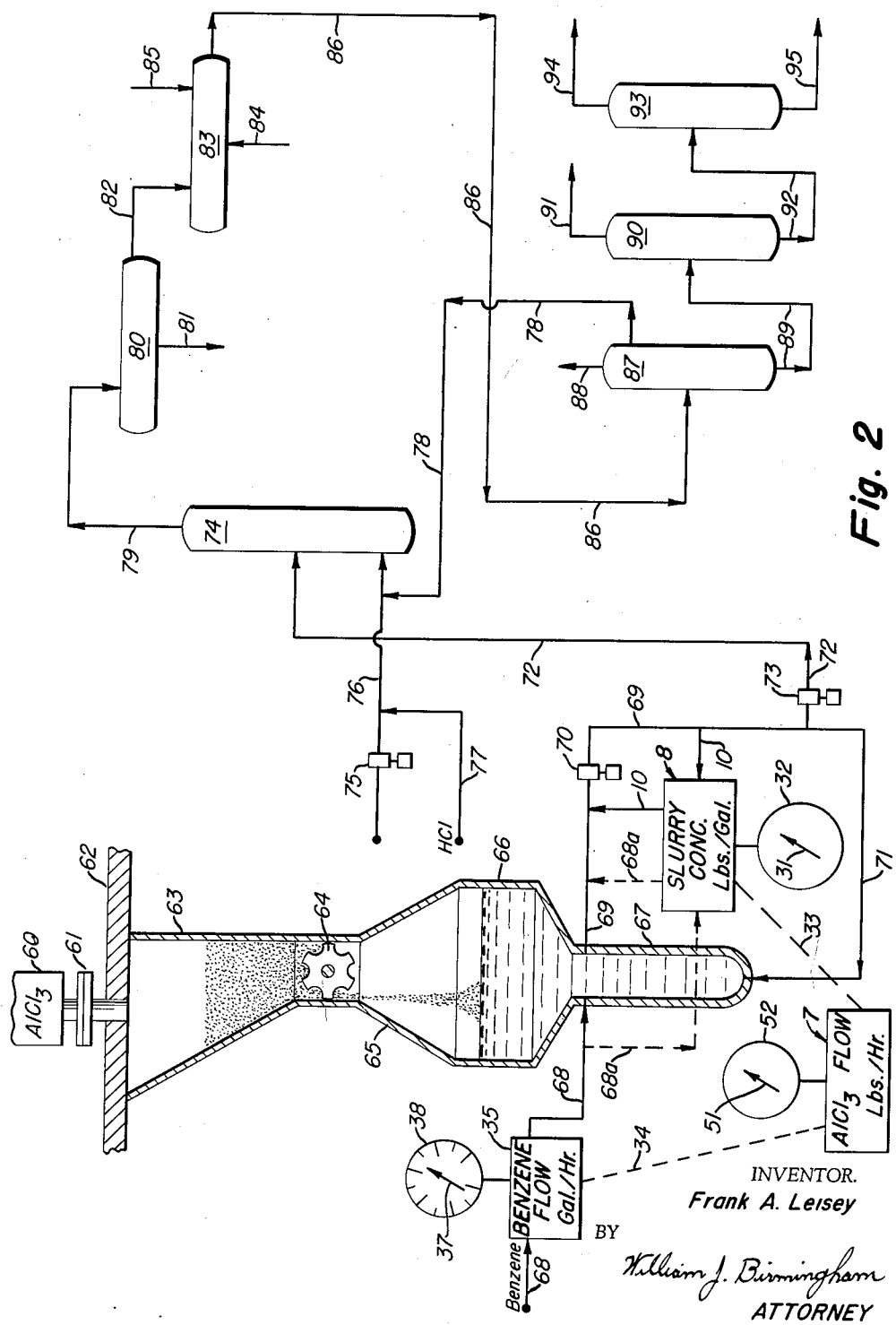

Further details and advantages of the present invention will be described hereinafter in conjunction with illustrations of the present invention in the accompanying drawings wherein:

FIGURE 1 is a schematic diagram of a particular embodiment of my invention showing how signals from the light-transmissivity comparison means (also referred to as the slurry concentration section) and from the flow measuring means (also referred to as the liquid flow section) are combined in a computer section to obtain a measure of solid flow rate; and FIGURE 2 shows how the apparatus of FIGURE 1 is employed in the manufacture of detergent alkylate to measure the rate of addition of aluminum chloride to benzene.

Referring to FIGURE 1, a fluid sample, e.g., a slurry of aluminum chloride in benzene is continuously fed via pipe 10 to sample cell 11, via inlet 12, and leaves sample cell 11 via an outlet opposite the inlet, which is not shown because of the section view of the sample cell 11. Sample cell 11 has light transmissive windows 13 and 14, thus permitting light to pass into the cell, through the fluid sample and out the opposite side of the same cell. Sample cell 11, its inlet and outlet sample connections and lines, and windows 13 and 14 are, of course, designed to withstand the temperature, pressure, corrosivity, and the like of the fluid sample, including customary design safety margins.

Light source 15 and reflector 16 supply the light rays penetrating the sample. The light transmitted through the sample in sample cell 11 impinges on photovoltaic cell 17 (e.g., a General Electric Company PV1). For comparison, light rays from source 15 and reflector 16 also impinge on photovoltaic cell 18, one terminal 19 of which is connected to the like terminal 20 of photovoltaic cell 17. The photovoltaic cells are thus so arranged that the polarity of the voltage from terminal 20 to terminal 21 of photovoltaic cell 17 is the same as the polarity from terminal 19 to terminal 22 of photovoltaic cell 18. The components just described are usually housed in a light-proof and explosion-proof housing (schematically indicated by rectangular box 9) to avoid entry of extraneous light rays and to minimize the explosion hazard.

In this particular embodiment, i.e., measurement of the addition rate of aluminum chloride to benzene, the light transmissivity of the benzene stream itself has been found to be substantially constant. Thus, any change in the light transmissivity of the slurry reflects a change in the concentration, and only the slurry need be continuously sampled. Where, however, the light transmissivity of the fluid medium itself, i.e., the benzene, changes, it is the comparative change in light-transmissivity of the slurry with respect to the light-transmissivity of the benzene that reflects a change in concentration. In such case, both the benzene and slurry must be continuously sampled. This is simply done in the present embodiment by adding a second sample cell, identical to sample cell 11, with appropriate inlet and outlet connections, in front of photovoltaic cell 18. The operation of the apparatus is the same in principle whether both the benzene and slurry are sampled or just the slurry itself. For simplicity in the remainder of the description, it will be assumed that just the slurry is being sampled.

Current produced by light impingement on photovoltaic cell 17 produces a voltage $E_1$ across variable resistor 23 and resistor 24. Current from photovoltaic cell 18 likewise produces voltage $E_2$ across variable resistor 25, multi-shunt resistor 26 and resistor 27. Relative polarity of the voltages is indicated by arrowheads. Photovoltaic cells 17 and 18 are so arranged within housing 9 that light impingement on photovoltaic cell 18 is sufficient so that voltage $E_2$ is equal to, or greater than, voltage $E_1$ at the point of maximum light-transmissivity for the fluid being sampled, e.g., when sample cell 11 is empty. Light impingement on photovoltaic cell 18 is, of course, a function of the distance from light source 15, position of reflector 16, angle of the surface of photovoltaic cell 18 with respect to the light source, percent of cell surface exposed, and the like. Screens, shutter, or filters 17a and 18a may be used for calibration purposes, for filtering out undesired wavelengths, for maximizing sensitivity of the apparatus, for reducing the light level and the like. For example, when monitoring a slurry of aluminum chloride and benzene, it has been found advantageous to use an amber light filter to eliminate fluorescence of the sample due to ultraviolet light from light source 15.

One terminal of servo-amplifier 28 is connected to the top of the variable balancing resistance network, i.e., to the upper part of the variable resistor 23, and thus to terminal 21 of photovoltaic cell 17. The other terminal of servo-amplifier 28 is connected to slider 29 on multi-shunt variable balancing resistor 26, across which is shunted a plurality of variable resistors 26a, 26b, etc. Rebalancing motor 30, associated with servo-amplifier 28, drives slider 29 until voltages $E_1$ and $E_3$ cancel each other and the net voltage across the terminals of servo-amplifier 28 is zero. Thus, it can be seen that as soon as the light transmissivity of the fluid sample entering sample cell 11 changes, $E_1$ also changes; and servo-amplifier 28 and motor 30 readjust the position of slider 29 so that $E_1$ and $E_3$ are again equal, and cancel each other. Thus, in summary, the signal from the components within housing 9 varies with light transmissivity of the fluid sample, and the network including the servo-amplifier 28 and motor 30 provides a self-balancing potentiometer system which is responsive to the signal. For ease of reference hereinafter, the components just described are enclosed within dash outline 8 and make up the slurry concentration section.

The response of motor 30 to change in the light-transmissivity of the sample is made adjustably non-linearizable by means of variable resistors 26a–26e shunted around portions of variable balancing resistor 26. As previously pointed out, an adjustably non-linearizable response from motor 30 is desired so that a linear relationship between the response of rebalancing motor 30 and concentration of aluminum chloride in benzene can be obtained. This adjustably non-linearizable response of the motor, which results in the desired linear relationship with respect to concentration, is important to the operation of the remaining computer components which will be described hereinafter. Indicator means 31 may be operatively connected to motor 30 and can be made to read directly in terms of concentration. In a typical installation indicator means 31 may be an arrow mounted on a shaft extension of motor 30 and indicator face 32 may be subdivided into the desired concentration, e.g., pounds of aluminum chloride per gallon of benzene.

The response of motor 30, which varies in accordance with concentration of aluminum chloride in benzene, is operatively connected, as indicated by dash line 33, to the computer section enclosed within dash outline 7, to be described hereinafter. These computer components also receive another signal, indicated by dash line 34, from the liquid flow measuring section 35. The flow measuring means 35 may be of conventional design, such as, for example, standard commercial devices for measuring pressure drop across an orifice. Thus, in this embodiment, the flow signal 36 may be the actual benzene stream itself which flows through a flow measuring orifice. Pressure drop across an orifice may be converted by a transducer to an air signal, which may be tapped to provide signal 34, and which may also be made to read directly in flow units by conventional devices, such as, for example, a Brown Pressure Recorder (Brown Instrument Company). In FIGURE 1, such optional flow reading is schematically represented by indicator arrow 37 and dial face 38.

A direct-current power supply 39 provides a substantially constant voltage $E_4$ across resistor 40 and also across a series of resistors represented by variable resistor 41, variable balancing resistor 42, and variable resistor 43. Slider 44 on resistance 40 is adjusted in accordance with the response of motor 30, indicated by dash line 33. Since the response of motor 30 is proportional to the slurry concentration, that is, the concentration of aluminum chloride in benzene, the voltage $E_5$ is proportional to said slurry concentration. A fraction of the voltage $E_5$ which appears across resistance 45a is tapped off, said fraction varying in accordance with the flow of benzene per unit of time. The resulting voltage, which in this embodiment is indicated as $E_6$, thus varies in accordance with the product of the slurry concentration and the benzene flow, i.e., the solid (aluminum chloride) flow rate, as indicated by the following formula:

$$\begin{array}{ccc}\text{(Slurry Concentration)} \times \text{(Benzene Flow)} = \text{(AlCl}_3\text{ Flow Rate)} \\ \text{(Lbs./Gal.)} \quad \text{(Gal./Hr.)} \quad \text{(Lbs./Hr.)}\end{array}$$

In the present embodiment two resistors 45a and 45b and two sliders 46a and 46b are used to obtain a fraction of voltage $E_5$, which fraction varies with the benzene flow. The use of two resistors and sliders results from the fact that in this particular embodiment benzene flow is indicated by an air signal, i.e., air pressure, which also actuates flow recorders 37 and 38, and said air signal varies with the square of the flow. Thus, signal 34 varies with the square of benzene flow, and to tap a fraction of voltage $E_5$, which fraction is linear with respect to benzene flow, a dual helipot, which is represented by said resistors 45a and 45b and sliders 46a and 46b, is used. Such a dual helipot is of conventional design wherein the resistance of resistor 45b is customarily at least 5 to 10 times greater than that of resistor 45a. Thus, for example, resistor 45a may be 500 ohms and resistor 45b may be 5000 ohms.

Slider 47 on resistor 42 is adjusted so that voltages $E_7$ and $E_6$ are the same, with relative polarities as indicated by the direction of the arrow heads. Voltage $E_7$ is automatically and continuously adjusted to equal voltage $E_6$ by means of servo amplifier 48 with associated motor 49, said motor 49 actuating slider 47 as indicated by dash line 50. Since motor 49 adjusts voltage $E_7$ to equal voltage $E_6$, and since voltage $E_6$ varies in accordance with the product of the concentration and benzene flow, that is, the aluminum chloride flow rate, the response of motor 49 is therefore a measure of said aluminum chloride flow rate. Indicator means, such as indicator arrow 51 and dial face 52 may be operatively connected to, or otherwise actuated by, motor 49 as shown by dash line 53 to read directly in terms of aluminum chloride flow rate. Variable resistors 41 and 43 are used for calibration purposes, that is, to adjust the minimum and maximum readings respectively.

When the above-described embodiment of my invention is used, for example, to measure the rate of aluminum chloride addition, e.g., in units of pounds per hour, it must first be calibrated. Thus, a series of standard samples corresponding to known aluminum chloride-in-benzene concentrations are successively placed in sample cell 11. For each standard sample, the appropriate resistance of multi-shunt resistance 26 is adjusted so that the concentration reading of indicator arrow 31 with respect to indicator face 32 corresponds to that particular sample concentration. During this adjustment, variable resistances 23 and 25 are, preferably, in mid position. When multi-shunt resistance 26 has been adjusted to the desired concentration scale as above described, no further adjustments are usually necessary during subsequent operation. Instead, any minor change in calibration can be quickly compensated for by adjusting variable resistances 23 and 25 to give the appropriate minimum and maximum scale readings, respectively. The benzene flow and computer sections may also be calibrated in similar fashion using techniques well known by those skilled in the art.

While only five continuous shunt resistances are shown across resistance 26, it should be understood that the number of shunts can be decreased or increased depending on the concentration ranges to be covered, on the number of calibration points desired, and the like. Furthermore, the particular electrical circuit is for illustration only and other alternate components may be substituted, e.g., dual helipots in the case of a square function relationship between light transmissivity and concentration.

The invention will be more clearly understood from FIGURE 2, which shows application of the invention to the manufacture of detergent alkylate by a process which requires careful control of the addition rate of anhydrous aluminum chloride to a benzene stream. Anhydrous granular aluminum chloride is of small particle size and is usually received in drums. Such a drum 60 is preferably secured to a flanged inlet pipe 61 on platform 62 so that the free-flowing granular aluminum chloride, which is preferably free from extremely fine particles, may be charged to hopper 63 without spillage or contact with air or moisture. The aluminum chloride is then metered by feeder 64 into the slurry vessel, the upper walls 65 of which are flared outwardly to minimize caking or bridging, the intermediate portion 66 being of relatively large diameter to provide a surge capacity for the benzene slurry, and the lower portion 67 thereof being of smaller diameter to provide the mixing section. Benzene is introduced through line 68 to serve as slurrying medium and a portion of the benzene slurry is continuously recycled from an upper point in the vessel to line 69 by circulating pump 70 and line 71 to the bottom of the vessel for maintaining a substantially uniform benzene slurry.

An aliquot part of this slurry is continuously introduced through line 72 by pump 73 into stirred reaction vessel 74. The selected olefin, which may be a propylene tetramer, is continuously introduced by pump 75 and line 76 into stirred reactor 74 and the hydrogen chloride promoter is introduced into this stream through line 77.

The reaction is effected in the presence of about 5 to 20 mols of benzene per mol of olefin and with about 1 to 10, e.g. about 3, weight percent of aluminum chloride and about .1 to 1, e.g. about .3, percent of HCl based on olefin. A complex immediately forms in the reactor and the desired alkylation is effected in a continuous manner, the reaction product being withdrawn through line 79 to settler 80 from which settled catalyst complex is withdrawn through line 81. The reaction mixture is then introduced by line 82 to treater 83 within which it is washed with caustic from line 84 and then with water from line 85. The water-washed material is then introduced by line 86 to benzene still 87 wherein water is removed through line 88. The removed benzene which must, of course, be substantially anhydrous, is returned to the reactor by line 78.

After removal of water and benzene, the product stream is removed via line 89 and is distilled under reduced pressure in fractionator 90 to separate light alkylate which is withdrawn through line 91. The bottoms from tower 90 are introduced by line 92 to another fractionator 93 which operates at a still lower pressure (higher vacuum). The desired detergent alkylate is obtained as an overhead stream through line 94, and the heavier alkylate is withdrawn through line 95.

In commercial operations it has been found that grievous difficulties are encountered if the introduction of aluminum chloride is not maintained substantially constant at a predetermined rate. Too much aluminum chloride results in decreased yields and products of inferior quality while too little aluminum chloride results in a loss of reaction, i.e., an "upset" which may require shutting down the whole plant and rerunning a large amount of material with consequent large loss of time, chemicals and product. The optimum amount of aluminum chloride can readily be determined for each particular system, taking into consideration the materials charged, the product to be produced and the physical arrangement of apparatus and this amount should not vary more than 1 percent in either direction.

Close control of the amount of introduced aluminum chloride is obtained by use of the method and means of the present invention. Thus, to obtain a signal which varies with benzene flow rate, e.g., gallons per hour, benzene flow means 35 is inserted in line 68 to measure the flow rate in gallons per hour of benzene, which may also be registered on indicator means 37 and 38. Thus, benzene flow in line 68 of FIGURE 2 corresponds to flow indication 36 of FIGURE 1. To obtain a signal which varies with slurry concentration, e.g., pounds of aluminum chloride per gallon of benzene, the slurry concentration section 8 receives a side stream sample 10 from slurry line 69. Slurry concentration is also registered, if desired, on indicator means 31 and 32. Where light transmissivity of the benzene may change, a small side stream of benzene may be bled off line 68, as indicated by dash line 68a, and introduced into slurry concentration section 8 wherein its light-transmissivity may be compared with that of the slurry, as discussed in connection with FIGURE 1. Of course, in the system shown in FIGURE 2, the inventory in the slurry vessel 66 is so large that momentary fluctuations in light-transmissivity of the benzene are for all practical purposes averaged out, and thus benzene side stream 68a is not considered necessary or desirable in this particular embodiment.

Signal 33, which varies with slurry concentration, and signal 34, which varies with benzene flow, are combined in the computer section 7, as previously described in connection with FIGURE 1. Their product provides a measure of aluminum chloride addition rate in pounds per hour, which may be printed or otherwise visually presented on any type of conventional indicator means, such as suggested by 51 and 52. As pointed out hereinabove, signals 33 and 34 should be linearized with respect to slurry concentration and benzene flow, respectively. Such linearization was obtained in connection with signal 33 by appropriate adjustments of multi-shunt resistor 26 of slurry concentration section 8, shown in FIGURE 1. If such linearization were not so obtained, appropriate linearization could be obtained in the computer section 7. Such linearization of signal 34, for example, was obtained in computer section 7 by use of a dual heliopot, as represented by resistors 45a and 45b and ganged sliders 46a and 46b, actuated by signals 34a and 34b, respectively, in FIGURE 1. It is therefore apparent that such linearization can be obtained before or after signals 33 and 34 are transmitted to the computer section.

While in FIGURE 1 and FIGURE 2, specific reference is made to measuring the addition rate of solid aluminum chloride to a flowing benzene stream, it should be understood, of course, the method and means of the present invention can be used in a similar fashion to measure the addition rate of any solid particle substance which is being added to any fluid stream. Likewise, while the units of pounds, gallons, and hours are used, it is obvious that other weight, volume, and time units may also be used and the apparatus calibrated accordingly.

From the description herein it is apparent that the objects of this invention have been attained. The detailed description, however, of the above embodiments of my invention is intended for the purpose of illustration only. Accordingly, it is contemplated that modifications can be made without departing from the scope or spirit of the invention.

Having described my invention, I claim:

1. An apparatus for determining the rate at which a normally solid substance is mixed with a light-transmissive fluid medium which comprises: a light-transmissivity comparison device providing a voltage which varies with the light-transmissivity of the mixture of said solid substance and said fluid medium; a first self-balancing potentiometer system responsive to the voltage from said light-transmissivity comparison device, said first self-balancing potentiometer system including a variable balancing resistance, a first rebalancing motor to adjust said variable balancing resistance to rebalance the potentiometer system, and multiple variable resistance in shunt around portions of said variable balancing resistance whereby the response of said first rebalancing motor is adjustable non-linearizable with respect to the voltage from said light-transmissivity comparison device, the first self-balancing potentiometer system thereby providing a first signal which varies in accordance with the concentration of said solid substance in said fluid medium; a flow-measuring means providing a second signal which varies with the flow per unit of time of said fluid medium; and a second self-balancing potentiometer system responsive to the product of said first signal and said second signal, said second self-balancing potentiometer system including a second rebalancing motor the response of which provides a measure of the rate at which said solid substance is mixed with said fluid medium.

2. The apparatus of claim 1 including a first indicator means actuated by the response of said first rebalancing motor, whereby indications of the response of said first rebalancing motor provide a measure of the concentration of said substance in said fluid medium.

3. The apparatus of claim 1 including a second indicator means actuated by the response of said second rebalancing motor.

4. An apparatus for determining the flow rate of a normally solid material commingled with a light-transmissive fluid medium which comprises: a light-transmissivity comparison device providing an electrical indication which varies with the light-transmissivity of the commingled solid material and fluid medium as compared with the light-transmissivity of said fluid medium alone; a first self-balancing potentiometer system responsive to said indication, said potentiometer system including a variable balancing resistance, a first rebalancing motor to adjust said variable balancing resistance to rebalance the potentiometer system, and multiple variable resistance in shunt around portions of said variable balancing resistance whereby the response of said first rebalancing motor is made adjustably non-linearizable with respect to said indication, said first rebalancing motor thereby providing a first signal which varies with the concentration of said normally solid material in said fluid medium; a flow-measuring means providing a second signal which varies with the flow per unit time of said fluid medium; and a second self-balancing potentiometer system responsive to the product of said first signal and said second signal, said second self-balancing potentiometer system including a second rebalancing motor to adjust a variable balancing resistance in said potentiometer system to rebalance said potentiometer system whereby the response of said second motor drive provides a measure of said rate.

5. The apparatus of claim 4 including a first indicator means actuated by the response of said first rebalancing motor, and a second indicator means actuated by the response of said second rebalancing motor.

6. An apparatus for determining the rate at which aluminum chloride is commingled with benzene, which comprises: a light-transmissivity comparison device providing an electrical signal which varies with the light-transmissivity of the commingled aluminum chloride and benzene; a first self-balancing potentiometer system responsive to said electrical signal, said potentiometer system including a variable balancing resistance, a first motor drive to adjust said variable balancing resistance to rebalance the potentiometer system, and multiple variable resistances in shunt around portions of said variable balancing resistance whereby the response of said rebalancing motor is adjustably non-linearizable with respect to said electrical signal, the potentiometer system thereby providing a first signal which varies with the concentration of said aluminum chloride in benzene; a first indicator means actuated by the response of said first rebalancing motor; a flow-measuring means providing a second signal which varies in accordance with the flow per unit time of said benzene; a second self-balancing potentiometer system responsive to the product of said first signal and said second signal, said potentiometer system including a second rebalancing motor to adjust a variable balancing resistance to rebalance said potentiometer system; and a second indicator means actuated by the response of said second rebalancing motor.

(References on following page)

References Cited in the file of this patent

UNITED STATES PATENTS

| | | |
|---|---|---|
| Re. 23,023 | Wolf et al. | Aug. 3, 1948 |
| 2,019,871 | Pettingill et al. | Nov. 5, 1935 |
| 2,145,591 | FitzGerald | Jan. 31, 1939 |
| 2,255,601 | Schmitt | Sept. 9, 1941 |
| 2,394,129 | West | Feb. 5, 1946 |
| 2,728,218 | Ramser | Dec. 27, 1955 |

OTHER REFERENCES

"Computing Circuits and Devices for Industrial Process Functions," an article by A. J. Hornfeck, in the Transactions of AIEE, vol. 71, pages 183–193, July 1952.

An article entitled "Servo Systems for Performing Automatic Operations," by Ernest Wall in Product Engineering, September 1953, pages 134–140.